Nov. 17, 1970    D. J. KOLESAR ET AL    3,540,321
MACHINE TOOL HEAD
Filed Dec. 16, 1968    7 Sheets-Sheet 1
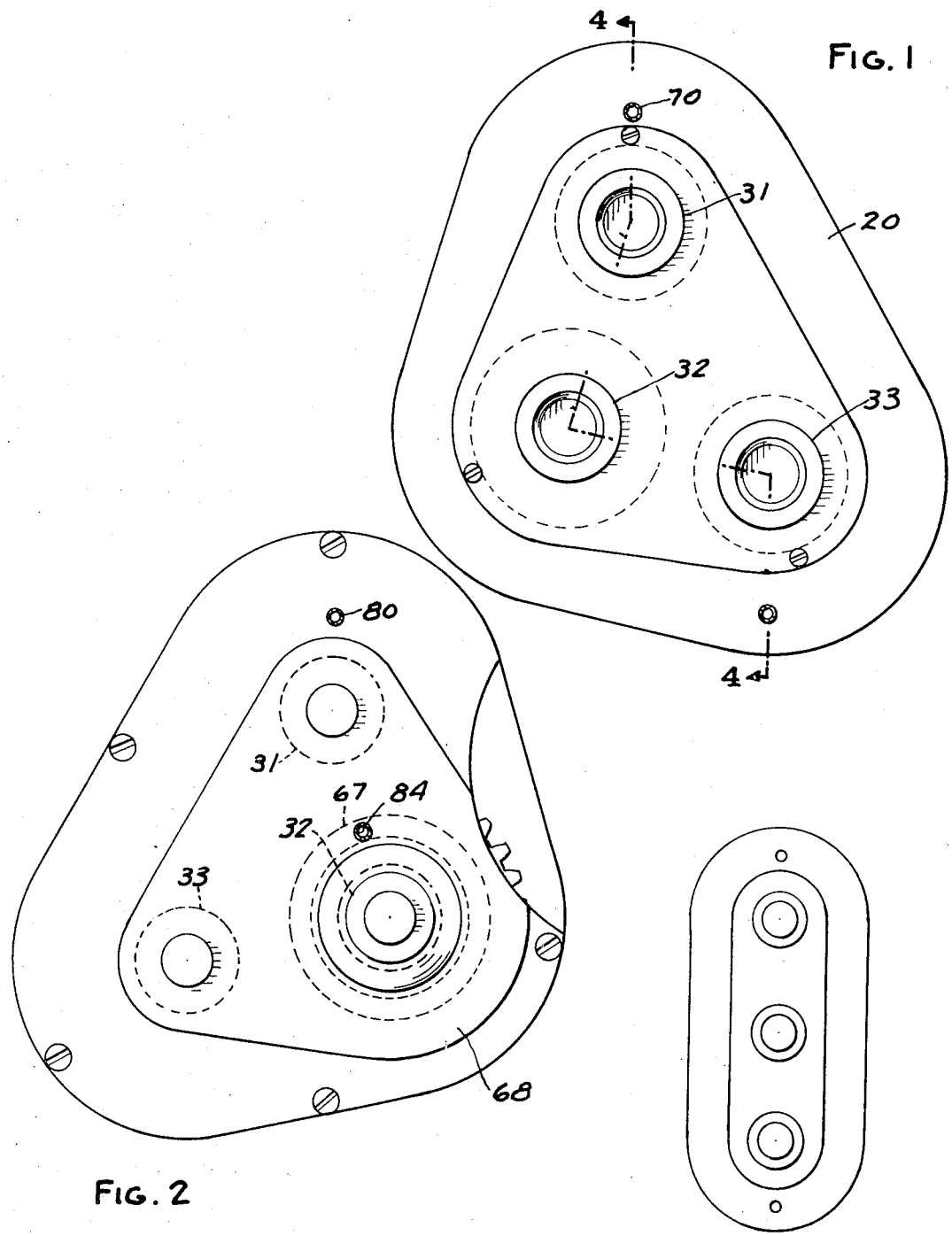
INVENTORS
DANIEL J. KOLESAR
GORDON H. PORATH
BY
Barnes, Kisselle, Raisch & Choate
ATTORNEYS

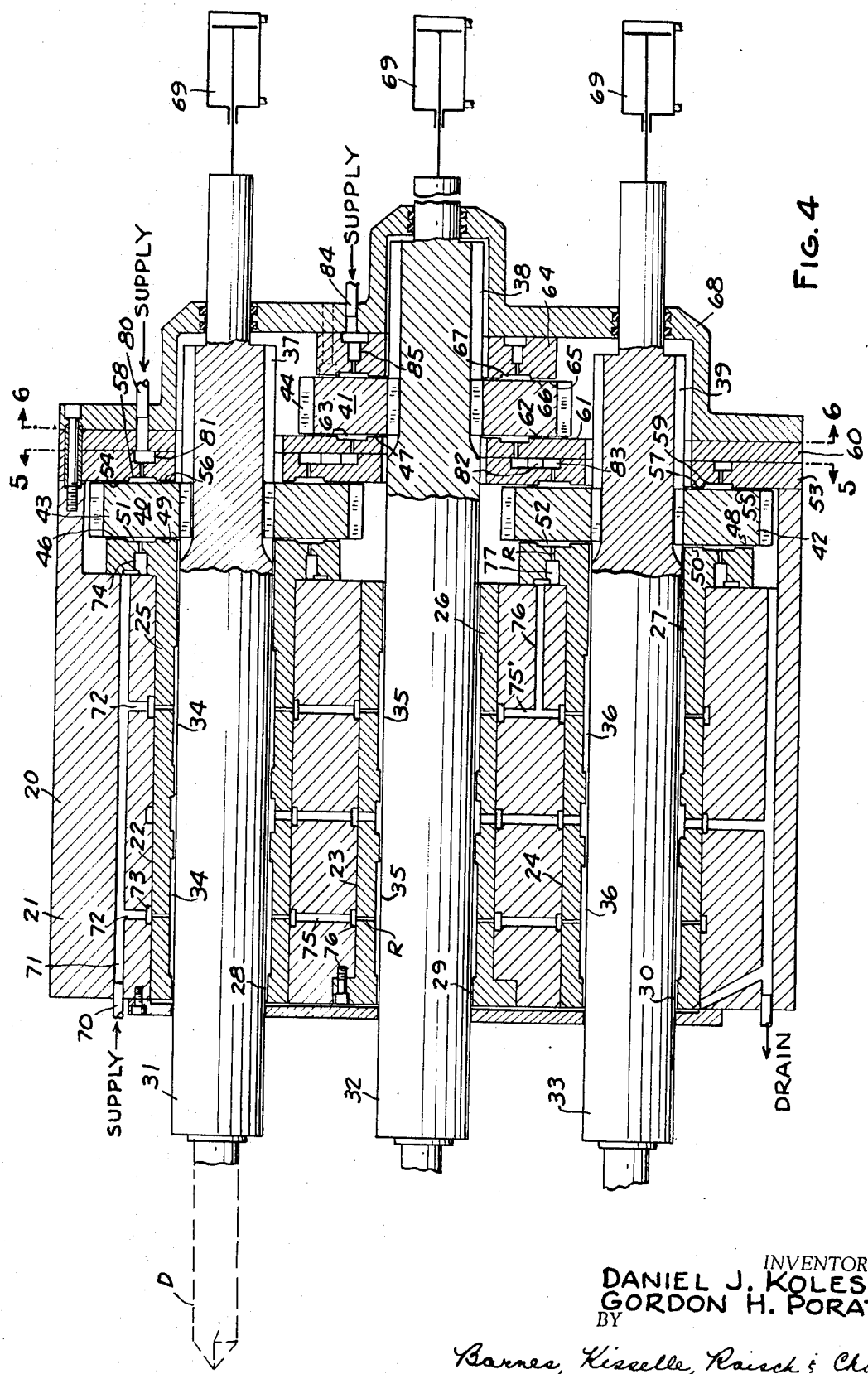

United States Patent Office 3,540,321
Patented Nov. 17, 1970

3,540,321
MACHINE TOOL HEAD
Daniel J. Kolesar, Warren, and Gordon H. Porath, Brighton, Mich., assignors to The Babcock & Wilcox Company, New York, N.Y., a corporation of New Jersey
Filed Dec. 16, 1968, Ser. No. 784,107
Int. Cl. B23b *39/16*
U.S. Cl. 77—22                                      9 Claims

ABSTRACT OF THE DISCLOSURE

A machine tool head comprising a body having spaced bores therein and a spindle associated with each said bore. Each spindle has a collar thereon and the collar and body have complementary spaced radially extending surfaces. The surfaces of the bore of the body and the radially extending surfaces of the body are provided with spaced pressure pads and associated restrictors and fluid is applied under pressure to each restrictor and its respective pad. Means are provided for rotating each spindle.

---

This invention relates to machine tool heads and particularly to machine tool heads which are commonly termed drill heads.

In the metal-cutting industries, it is common practice to use what are called "drill heads," that is, heads with a multiplicity of spindles driven through gearing from a common input shaft. These are used in production situations in which it is economical to make a special machine to perform some multiple operation such as drilling, reaming, boring etc. repeatedly on each of a large quantity of identical parts.

These drill heads suffer from a variety of problems, most of which are caused by the comparatively close spindle spacing which is often called for by the pattern to be machined. For example, if the spindles are closely spaced and if a heavy cut is to be taken, the thrust bearings cannot be as large as they should be to take the thrust load, resulting in rapid degradation of head performance. Sometimes the heat buildup in the head tends to affect the bearing preloads unequally, causing variable and inadequate machining accuracy. In many cases, where the work to be done involves a variety of different diameters, so that different feeds and speeds would be desirable, the usual drill head cannot be adapted to provide individual feed of the spindles unless very small and inadequate bearings or plain bushings are used, resulting in comparatively poor machinery accuracy. This is also true in applications which require tapping, in which case a lead screw feed must be used with a quill bearing whose accuracy may be marginal. In all of these cases, it is common for wear rates to be excessive so that even where an application is a good one to begin with, the drill head wears out so rapidly so that unacceptable parts are produced or excessive maintenance is required.

Among the objects of the invention are to provide a multi-spindle machine tool head which is compact in size, permitting comparatively close spacing of spindles; which will accurately support and move tools toward and away from the workpiece; and which will not wear appreciably in service.

DESCRIPTION OF THE DRAWINGS

FIG. 1 is a front end view of a machine tool head embodying the invention.

FIG. 2 is an end view of the same.

FIG. 3 is a front view of a modified form of machine tool head.

FIG. 4 is a longitudinal sectional view on an enlarged scale taken along the line 4—4 in FIG. 1.

DESCRIPTION

Figure 5:
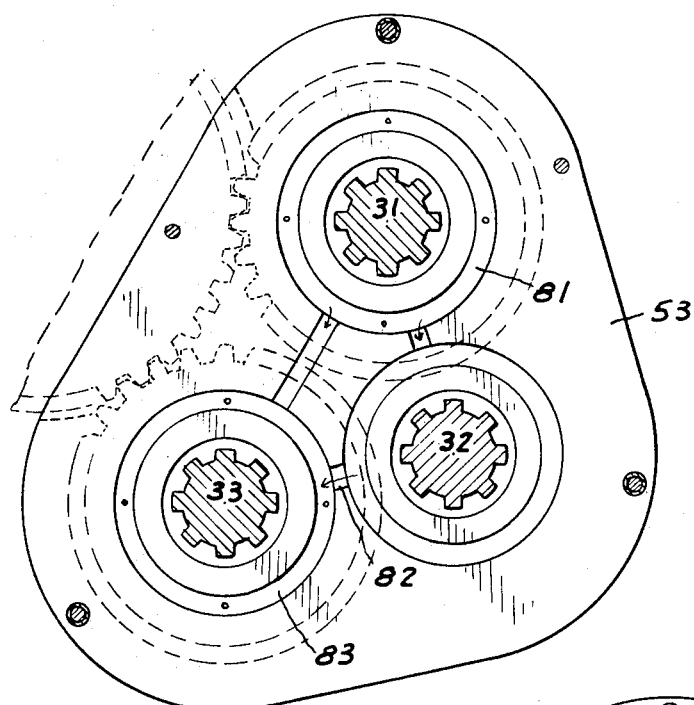
FIG. 5 is a sectional view taken along the line 5—5 in FIG. 4.
Figure 6:
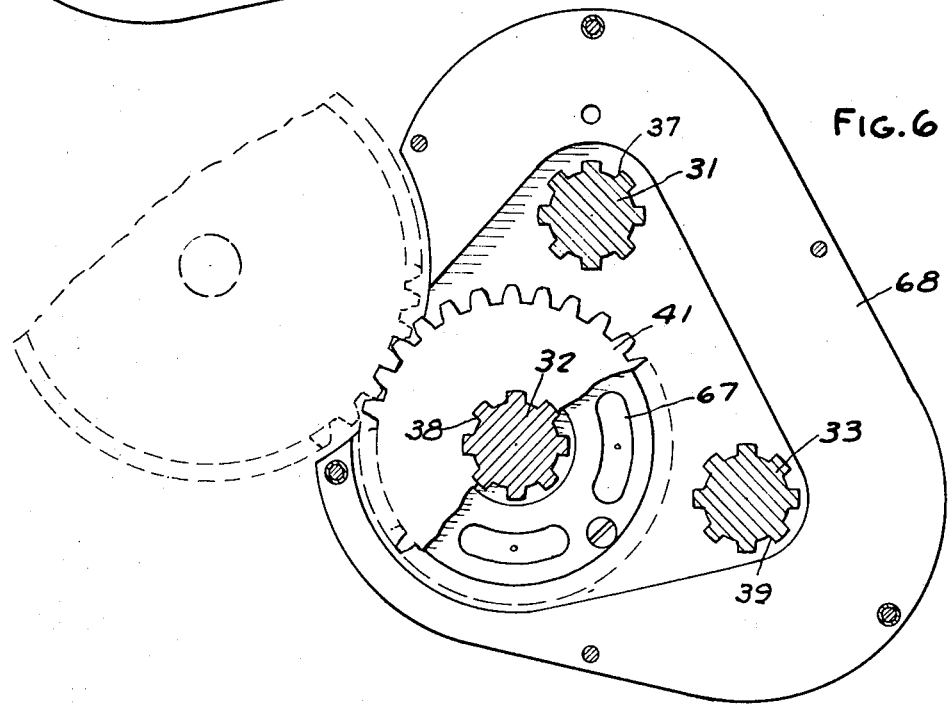
FIG. 6 is a sectional view taken along the line 6—6 in FIG. 4.

Referring to FIGS. 1–6, the machine tool head 20 embodying the invention comprises a housing 21 having spaced longitudinally extending bores 22, 23, 24 in which flanged sleeves 25, 26, 27 are inserted to define cylindrical bores 28, 29, 30 that receive cylindrical spindles 31, 32, 33, each of which supports a tool such as a drill D at the end thereof.

Each of the cylindrical bores 28, 29, 30 is provided with circumferentially spaced sets of pressure recesses or pads 34, 35, 36, each of which in turn have a restrictor R in the form of a capillary or orifice associated therewith. Fluid is supplied under pressure to each of the pressure pads, 34, 35, 36, as presently described, so that a thin film of fluid flows between the surfaces 28, 29, 30 and the surfaces of the spindles 31, 32, 33, respectively, to maintain the spindles in accurate radial position with respect to their bores.

Each of the spindles 31, 32,, 33 is formed with a spline 37, 38, 39, respectively, and a collar 40, 41, 42 having a complementary internal spline is meshed with the respective spines 37, 38, 39. Gear teeth 43, 44, 45 are provided on the periphery of the collars 40, 41, 42 for driving the collars and, in turn, the spindles.

Each of the collars 40, 41, 42 has a radially extending surface 46, 47, 48. The surfaces 46, 48 are adjacent complementary surfaces 49, 50 on the inserts or sleeves 25, 27. Surfaces 49, 50 are provided with circumferentially spaced pressure recesses or pads, 51, 52, each of which has a restrictor R associated therewith. Fluid under pressure is supplied to the pressure pads 51, 52 so that a thin film of fluid flows between the surfaces 46, 49 and 48, 50.

A plate 53 is provided adjacent the opposite radial surfaces 54, 55 of the collars 40, 42 and has complementary surfaces 56, 57, each of which has circumferentially spaced pads 58, 59 therein and associated restrictors R so that when fluid is supplied under pressure to the pressure pads 58, 59, it will flow in a thin film between the surfaces 54, 56 and 55, 57.

A second plate 60 is provided adjacent plate 53 and has a surface 61 adjacent the radial surface 62 on the collar 41. Surface 61 is formed with circumferentially spaced pressure recesses or pads 63 which have restrictors R associated therewith so that when fluid under pressure is supplied to the pressure pads 63, it flows in a thin film between the surfaces 61, 62.

A third plate 64 is provided adjacent the other radial surface 65 of collar 41 and has a surface 66 formed with circumferentially spaced pressure pads 67, each of which has a restrictor R associated therewith, so that when fluid under pressure is supplied to the pressure pads 67, it flows in a thin film between the surfaces 65, 66.

An end member 68 is provided over the rear ends of the spindles and portions of the spindles extend through the member 68. Linear motors 69 such as piston motors are provided for reciprocating the spindles.

The fluid supplied to each of the pressure pads enters the housing at one end through an inlet 70 and passes through an axial passage 71. Interconnecting passages 72 direct the fluid to an annular passage 73 for supplying the pressure pads 34 while interconnecting annular passage 74 directs the fluid to the pressure pads 51.

Fluid is supplied to the pressure pads 35, 52 by first passing from the annular passage 73 through transverse passages 75 to annular passages 76 that supply the pressure pads 35. One of the transverse passages 75' has an interconnecting longitudinal passage 76 extending to an annular passage 77 for supplying the pressure pads 52.

Fluid also enters the system through an inlet 80 in the end member 68 and passes to an annular passage 81 that supplies pressure pads 58 as well as pressure pads 63. Pressure pads 59 receive fluid from a transfer passage 82 that supplies another passage 83.

A third inlet 84 supplies an annular passage 85 for the directing fluid to the pressure pad 67.

In operation, fluid is supplied to each of the pressure pads and serves to support the spindles 31, 32, 33 in accurate stable relationship relative to one another and to the housing 20. By rotation of the collars 40, 41, 42, the spindles are rotated and by operation of the motor 69, the spindles are moved axially.

By providing the collars 40, 41, 42 in longitudinally spaced relation relative to one another and in overlapping projected relation to one another, a more compact structure is provided permitting its usage in limited spaces.

Figure 7:
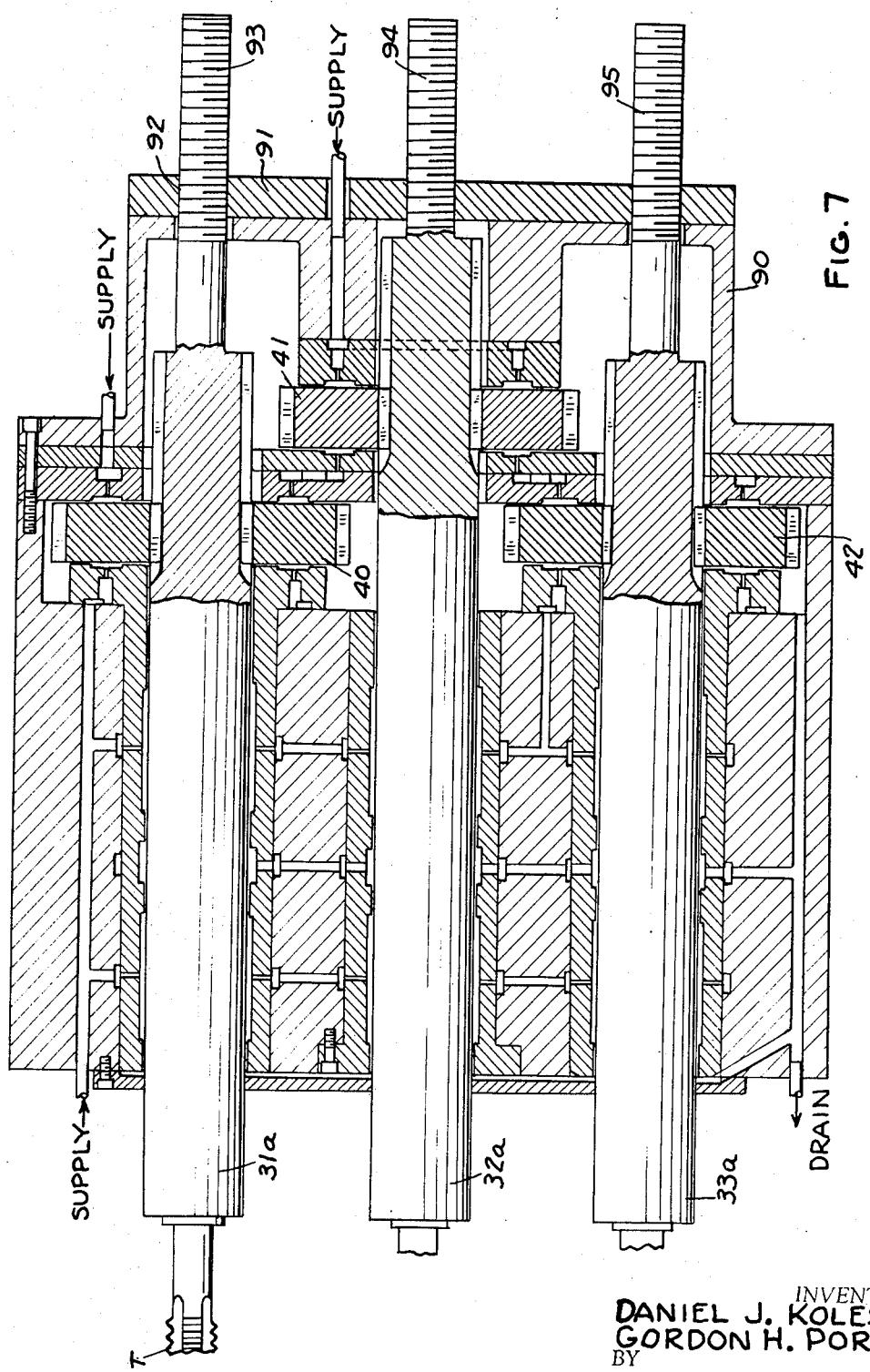
FIG. 7 is a longitudinal sectional view through a modified form of machine tool head.

In the form of the invention shown in FIG. 7, the structure is substantially the same as that shown in FIG. 4 except that the end member 68 has been removed and replaced by an end member 90 that includes a plate 91 having threads 92 therein for engaging the threaded ends 93, 94, 95 on the spindles 31', 32', 33'. The spindles carry a tool such as a tap T. Upon rotation of the collars 40, 41, 42, the spindles are threaded inwardly and outwardly with respect to the plate 91 because of the threaded interengagement longitudinally.

Figure 8:
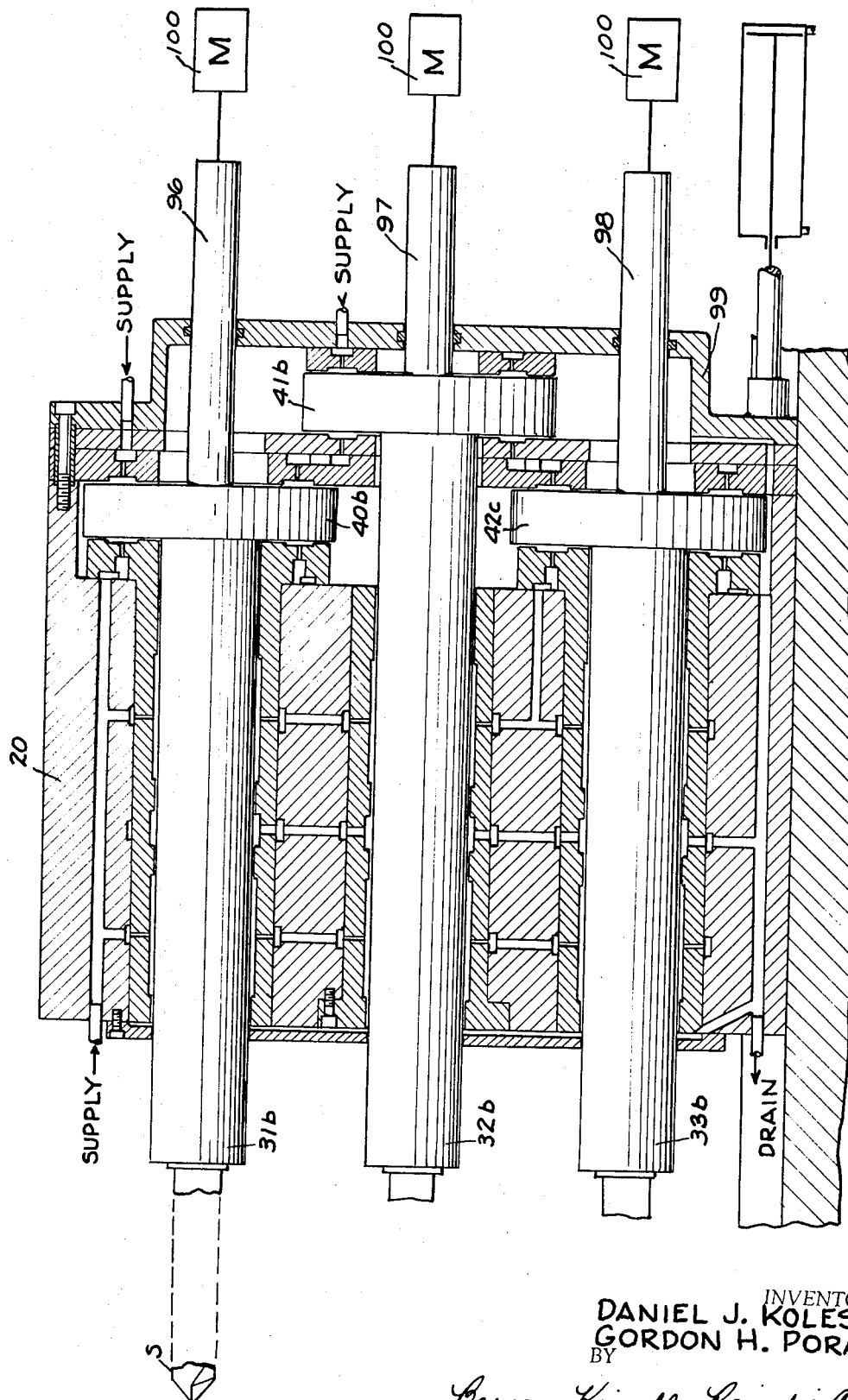
FIG. 8 is a longitudinal sectional view through a further modified form of machine tool head.

In the form of the invention shown in FIG. 8, the spindles 31b, 32b, 32c are fixed on collars 40b, 41b, 42c, rather than the spline connection used in the previous forms of the invention and the ends 96, 97, 98 of the spindle extend through an end housing member 99 and are operatively connected to rotary motors 100. This form of the invention can be utilized in connection with the use of tools wherein no axial movement of the spindles is required. Alternatively, the housing 20 can be mounted on a slide to provide for axial movement of the tools.

Figure 9:
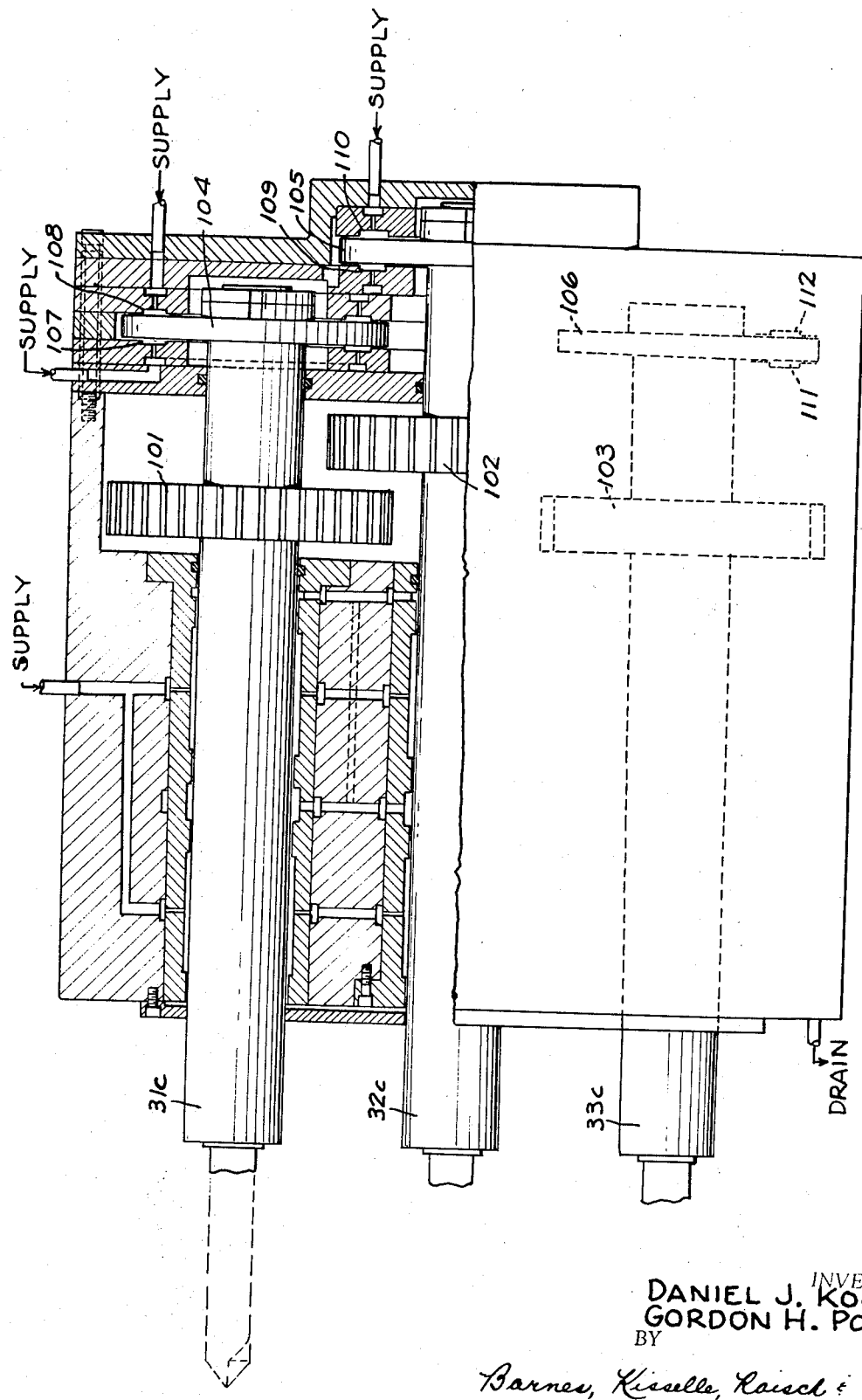
FIG. 9 is a part sectional longitudinal view through a further modified form of machine tool head.

In the form of the invention shown in FIG. 9, the spindles 31c, 32c, 33c have gears 101, 102, 103 formed thereon for rotation thereof. However, in this form, the hydrostatic support against thrust or longitudinal movement is supplied by separate radial members 104, 105, 106 which have complementary surfaces with respect to the housing and corresponding pressure pads or recesses 107, 108, 109, 110, 111 and 112 to which fluid is supplied and as will be apparent in the same manner as in the previous form of the invention. Such a system can be utilized in order to obviate the necessity of making accurate radial surfaces on gears and can be used where longitudinal spacing is not critical.

Figure 10:
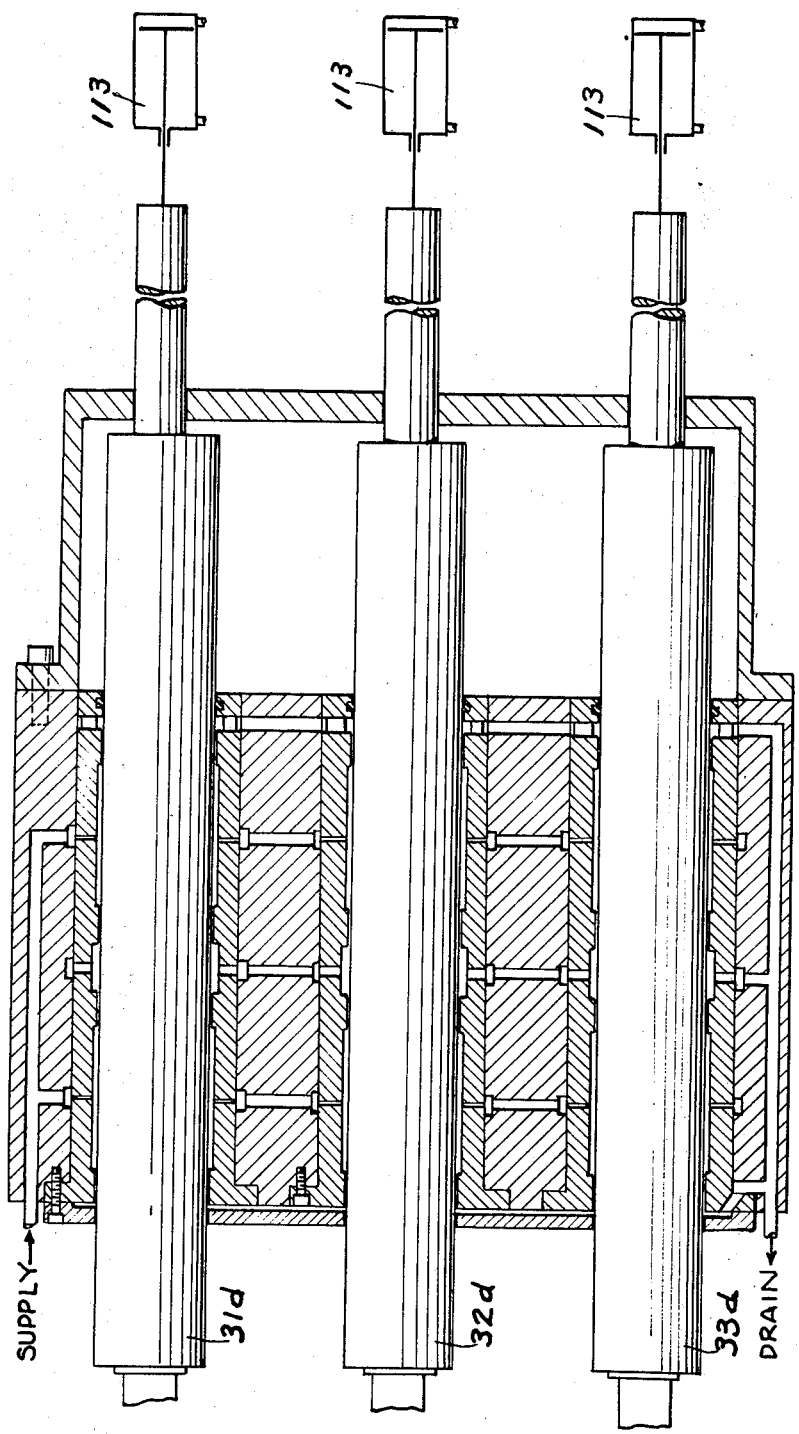
FIG. 10 is a part sectional longitudinal view through a further modified form of machine tool head.

In the form of the invention shown in FIG. 10, the spindles 31d, 32d, 33d do not have any gears or flanges thereon and are therefore reciprocable axially by piston motors 113. Otherwise the spindles are supported in the same manner as in the previously described forms of the invention.

In the form of the invention shown in FIG. 3, the axes of the spindles lie in a single plane as contrasted to the staggered relationship shown in FIGS. 1 and 2.

We claim:
1. In a machine tool head, the combination comprising:
a body having a plurality of spaced bores therein,
a spindle associated with each said bore,
each said bore having longitudinally spaced sets of circumferentially spaced pressure pads,
means for supplying fluid under pressure to each said pressure pad,
each said spindle having a collar thereon extending radially outwardly therefrom,
said body and said collar having generally radially extending complementary surfaces,
said complementary surfaces of said body having circumferentially spaced pressure pads thereon,
means for supplying fluid under pressure to each said pressure pad,
a restrictor associated with each said pressure pad,
said collars being longitudinally spaced such that they are out of contact with one another,
the spacing between the axes of said bores being such that the projected areas of adjacent collars overlap one another,
and means for supporting a tool on each said spindle.
2. The combination set forth in claim 1 wherein each said collar has circumferentially spaced teeth thereon for driving its respective spindle.
3. The combination set forth in claim 2 wherein each said collar and its respective spindle have spline teeth permitting relative longitudinal movement therebetween.
4. The combination set forth in claim 1 including means for moving each said spindle longitudinally relative to said body and its respective collar.
5. The combination set forth in claim 4 wherein said last-mentioned means comprises a linear motor associated with each said spindle.
6. The combination set forth in claim 4 wherein said last-mentioned means comprises a nut,
the end of each said spindle having a thread thereon,
said nut being threaded on said threaded portion of said spindle,
whereby upon rotation of said spindle said spindle is translated by being threaded relative to said nut.
7. The combination set forth in claim 1 including means externally of said body for rotating each said spindle.
8. The combination set forth in claim 1 including a gear on each said spindle for rotating each said spindle.
9. The combination set forth in claim 1 wherein the axes of said bores lie in a single plane.

References Cited

UNITED STATES PATENTS

| 3,438,287 | 4/1969 | Kampmeier et al. | 77—1 XR |
| 3,223,463 | 12/1965 | Porath | 308—9 |
| 2,093,343 | 9/1937 | Walther | 77—22 |
| 1,697,848 | 1/1929 | Boynton | 77—23 XR |

FRANCIS S. HUSAR, Primary Examiner

U.S. Cl. X.R.

308—9